Figure 6:
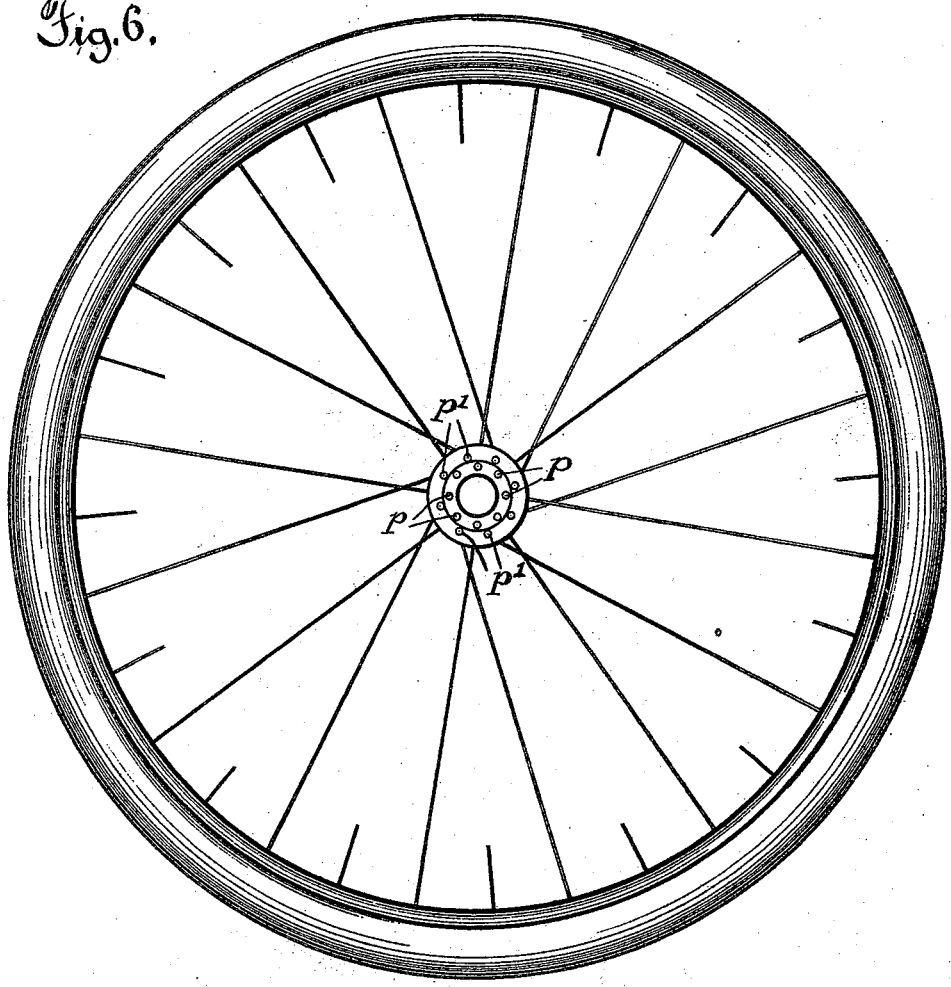

(No Model.)  3 Sheets—Sheet 1.
J. S. COPELAND.
BAND BRAKE FOR VEHICLES.
No. 516,986.  Patented Mar. 20, 1894.
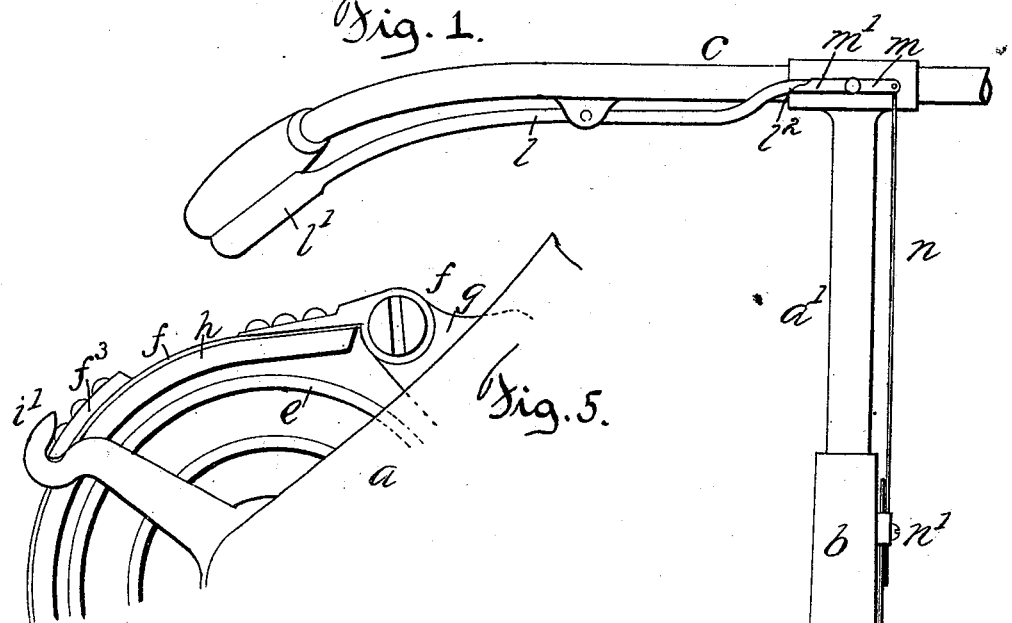
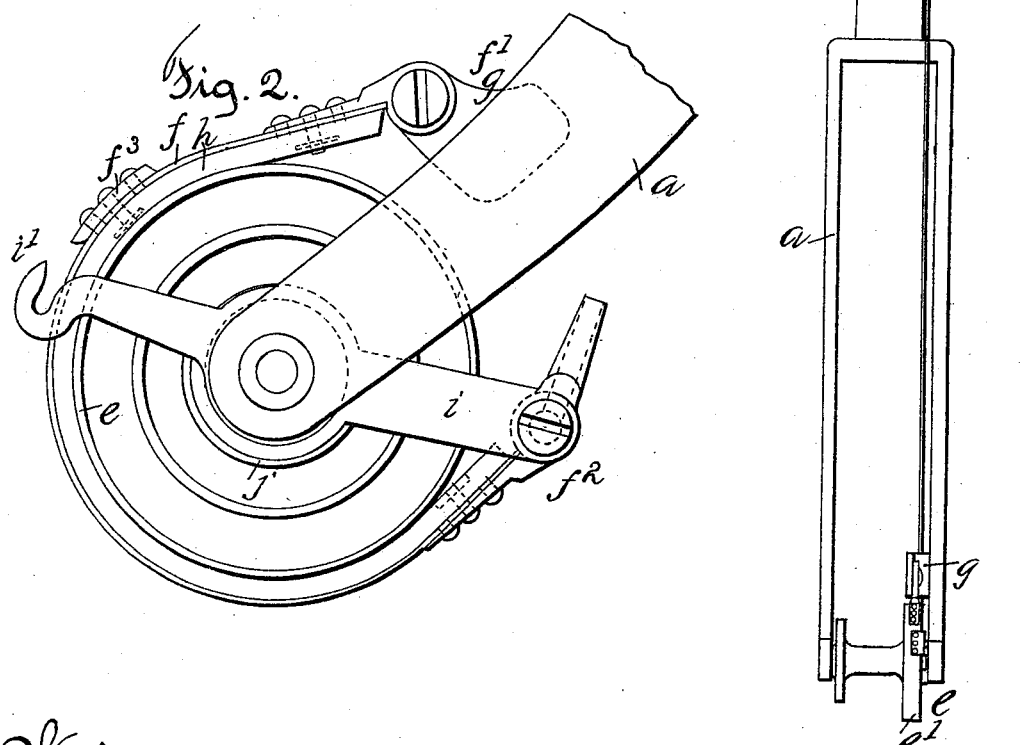
Witnesses
H. T. Giddings
G. B. Jenkins
Inventor
James S. Copeland
by Chas. L. Burdett
Attorney (No Model.) 3 Sheets—Sheet 2.
J. S. COPELAND.
BAND BRAKE FOR VEHICLES.
No. 516,986. Patented Mar. 20, 1894.
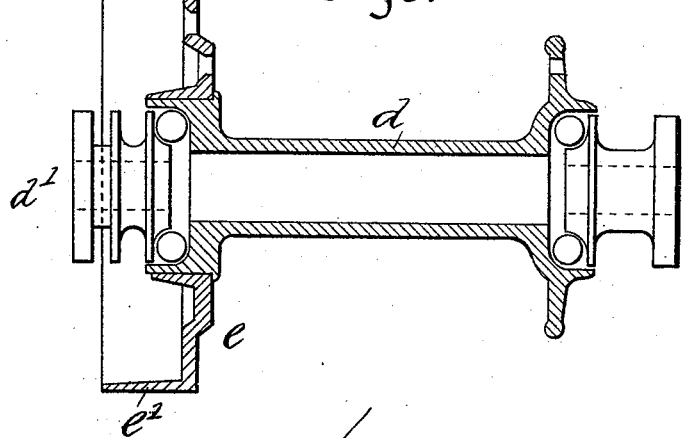
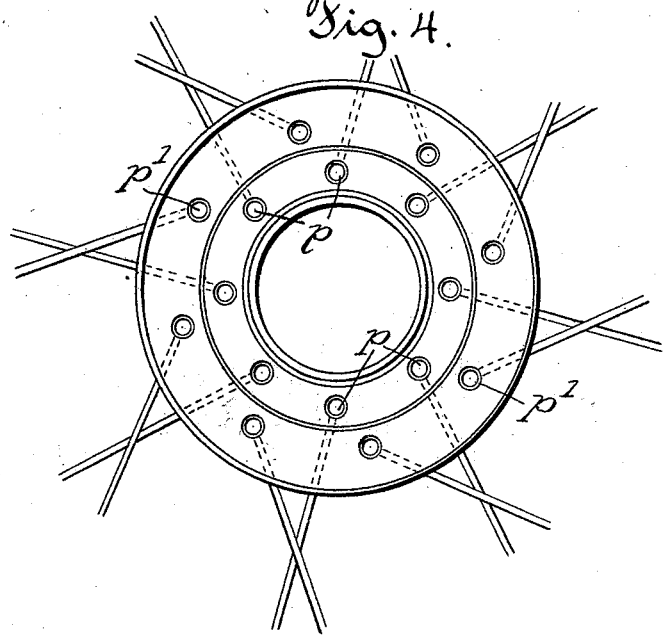

(No Model.) 3 Sheets—Sheet 3.
J. S. COPELAND.
BAND BRAKE FOR VEHICLES.

No. 516,986. Patented Mar. 20, 1894.

UNITED STATES PATENT OFFICE.

JAMES S. COPELAND, OF HARTFORD, CONNECTICUT, ASSIGNOR TO THE POPE MANUFACTURING COMPANY, OF BOSTON, MASSACHUSETTS.

BAND-BRAKE FOR VEHICLES.

SPECIFICATION forming part of Letters Patent No. 516,986, dated March 20, 1894.

Application filed May 11, 1892. Serial No. 432,621. (No model.)

*To all whom it may concern:*

Be it known that I, JAMES S. COPELAND, of Hartford, in the county of Hartford and State of Connecticut, have invented certain new and useful Improvements in Band-Brakes for Vehicles, of which the following is a full, clear, and exact description, whereby any one skilled in the art can make and use the same.

The object of my invention is to provide a brake that will be operative on some other portion of a wheel than the tire of a bicycle or like vehicle and in a form that will remove the previous objections to old forms of brakes of this class.

To this end my invention consists in a band brake and in the combination of the several parts making up the brake as applied to a wheel as more particularly hereinafter described and pointed out in the claims.

Referring to the drawings: Figure 1 is a detail front view of the front fork and part of the handle of a bicycle showing the manner of applying the brake. Fig. 2 is a detail side view on enlarged scale showing the brake. Fig. 3 is a detail view in central section of the axis of the wheel showing the brake flange. Fig. 4 is a detail front view of the spoke flange showing the distribution of the fastening points. Fig. 5 is a detail view illustrating the operation of the separator arm in holding the band out of contact with the surface of the drum. Fig. 6 is a view in elevation of a wheel showing my improved hub, a rim and those of the spokes which are appurtenant to one end of the hub; those extending to the other end being broken off near the rim.

In the accompanying drawings the letter $a$ denotes the front fork of a bicycle, $b$ the steering head and $a'$ the steering post to which the fork $a$ is secured, and also the handle $c$, in any convenient manner. A wheel is mounted in the fork on any convenient form of bearings and has a hollow hub $d$ through which the axis extends and is secured. This hub, in the form of my invention herein described, is provided on one end $d'$ with a flanged ring $e$ that is firmly secured to the hub in any convenient manner and has a flange $e'$, preferably flat on the outer side so as to afford a binding surface for the band brake $f$ that is mounted in operative relation to the surface of the flange.

The band brake is preferably pivoted at the end $f'$ to a bracket $g$, that is secured to the fork, and wraps to a greater or less extent around the ring $e$ and terminates in a socket piece $f^2$ that is preferably pivoted to the outer end of the brake. This brake is made up preferably of a metallic spring having secured to its under side a shoe $h$, made of leather or like durable material that is flexible and adapted to wrap closely about and bind upon the surface of the flange. To this outer end of the brake there is pivotally attached a rocking arm $i$ that is fulcrumed on a fixed part of the axis and extends transversely across the brake as a whole. The outer end of this arm is provided with a separator cam $i'$ the function of which is to engage a lug $f^3$ preferably formed by a piece of metal bolted to the brake at the proper place to be engaged by the cam and which when so engaged causes the band brake as a whole to be lifted out of engagement with the surface of the ring. This rocking arm is held normally with the separator cam in engagement with the lug by means of a spring $j$ that is coiled about the axis with one end secured to a fixed part of the fork and the other to the arm in such manner as to tend normally to hold the cam in engagement with the lug. The arm has the position at this time indicated in Fig. 5 of the drawings and by the use of this arm or its equivalent a serious objection to this form of brake as a whole is removed. The difficulty has been to prevent such a brake from clinging to the surface of the wheel at times when it is not desired to have the brake in operation, so that it has been rather a detriment than an aid. This separator arm forms an element in my improved brake that effectually prevents the latter from engaging the surface of the wheel except when the brake is intentionally put into operation by a thrust or pull that throws the cam out of engagement with the lug and throws the shoe of the brake into contact with the surface beneath it.

I prefer to operate this band brake by means of a lever $l$ pivoted to the handle bar and having one end in engagement with the shorter lever *m* so that by lifting on the handle *l'* the lever *m* that is pivoted to the handle at the center is rocked in such manner as to exert a pulling strain upon the rod *n* that is provided with suitable takeup means *n'* to enable the proper degree of strain to be put upon the brake by a given extent of movement of the handle *l'* of the lever. At the point of connection between the levers *l* and *m* there is preferably no pin or like securing means but the surface of the end *l²* of the lever is beveled on one side and rests against a similarly beveled socket *m'* on the end of the lever *m*, the resting of such surfaces against each other tending to compensate for any wear and take up and provide for any rattle between the parts that are in contact.

It is obvious that the main feature of the improvement residing in the separator device used in connection with the band brake may be applied in various forms and to any other wheel as well as to the steering wheel, and my invention is not limited to the particular manner of application nor to the particular means employed in applying the features of the separator to the band brake.

In order to provide for the peculiar strain that is thrown upon the wheel by the operation of the brake applied in the manner described the spokes are anchored to the flange of the hub alternately, the end of one spoke extending to the inner series *p* of holes while the end of the next spoke is anchored in the outer series *p'* of holes. By this means spokes of equal length are used and at the same time connection is made in such manner as to prevent any danger of rupture of the spokes by reason of the extra stress put upon them by the operation of the brake.

The flange of the hub to which the brake drum is applied is formed on different planes or offset, as shown in the sectional view in Fig. 3, the object being to allow the spokes which are anchored in the hub flange to all project from the inner side and pass each other without being bent.

I claim as my invention —

1. In combination with a brake band supported from its ends in operative relation to the drum about which it is wrapped, a separator arm extending across the edge of the drum and engaging a part of the band between its points of support and normally operating to lift the band out of contact with the drum, and the brake operating lever and connections all substantially as described.

2. In combination with a flanged wheel, a band brake adapted to embrace the flange, a separator arm with its operating spring and having a cam adapted to engage a projection on the brake, and the brake operating lever, all substantially as described.

3. In combination with a flanged wheel, a band brake mounted in operative relation thereto, a separator arm bearing a cam, the spring operating to hold the cam normally in engagement with the brake, and the brake and arm operating means, all substantially as described.

4. In combination with the fork of a bicycle, a wheel hub bearing a flange secured thereto, a band brake secured to the fork and embracing the flange, an adjustable pull rod extending from the outer end of the brake to the outer end of a short lever, a short lever *m* pivoted to the steering bar, the handle lever also pivoted to the handle bar and having a beveled end engaging a beveled socket on the lever *m*, all substantially as described.

JAMES S. COPELAND.

Witnesses:
  CHAS. L. BURDETT,
  GEO. H. DAY.